United States Patent
Zhao

(10) Patent No.: US 12,192,967 B2
(45) Date of Patent: Jan. 7, 2025

(54) METHOD AND APPARATUS FOR USING SIDELINK BANDWIDTH PART

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 349 days.

(21) Appl. No.: 17/704,923

(22) Filed: Mar. 25, 2022

(65) Prior Publication Data

US 2022/0217684 A1 Jul. 7, 2022

Related U.S. Application Data

(63) Continuation of application No. PCT/CN2019/109369, filed on Sep. 30, 2019.

(51) Int. Cl.
| | |
|---|---|
| *H04W 72/02* | (2009.01) |
| *H04W 72/044* | (2023.01) |
| *H04W 72/23* | (2023.01) |
| *H04W 72/56* | (2023.01) |

(52) U.S. Cl.
CPC ........ *H04W 72/02* (2013.01); *H04W 72/044* (2013.01); *H04W 72/23* (2023.01); *H04W 72/56* (2023.01)

(58) Field of Classification Search
None
See application file for complete search history.

(56) References Cited

U.S. PATENT DOCUMENTS

| | | | |
|---|---|---|---|
| 2018/0098322 A1 | 4/2018 | Yoon | |
| 2021/0153065 A1* | 5/2021 | Adjakple | .............. H04W 80/02 |
| 2021/0160876 A1* | 5/2021 | Osawa | ................. H04L 5/0091 |
| 2021/0243726 A1* | 8/2021 | Osawa | ................. H04W 72/20 |
| 2021/0385710 A1* | 12/2021 | Jin | .................... H04W 36/0072 |
| 2022/0295515 A1* | 9/2022 | Behravan | .......... H04W 72/0446 |

FOREIGN PATENT DOCUMENTS

| | | |
|---|---|---|
| CN | 109429334 A | 3/2019 |
| EP | 3444990 A1 | 2/2019 |

OTHER PUBLICATIONS

PCT/CN2019/109369 International Search Report dated Mar. 31, 2020, 3 pages.
Huawei, Hisilicon: "BWP operation for V2X sidelink", 3GPP Draft; R1-1904690; Apr. 2019; 6 pages.
European Patent Application No. 19947845.4, extended Search and Opinion dated Apr. 21, 2023, 10 pages.
SAMSUNG "On Resource Allocation for NR V2X Mode 1" 3GPP TSG RAN WG1 #98, R1-1908476, Aug. 2019, 8 pages.

(Continued)

*Primary Examiner* — Lonnie V Sweet
(74) *Attorney, Agent, or Firm* — Cozen O'Connor

(57) ABSTRACT

A method and apparatus for using a sidelink bandwidth part. The method is implemented by a terminal and includes: receiving a configuration signaling, in which the configuration signaling includes a first information field, and the first information field is configured to indicate a time domain resource location corresponding to a sidelink resource pool; and using the sidelink bandwidth part at the time domain resource location.

17 Claims, 5 Drawing Sheets

(56) References Cited

OTHER PUBLICATIONS

Spreadtrum Communications "Discussion on physical layer structure for sidelink" 3GPP TSG RAN WG1 #98, R1-1908974, Aug. 2019, 15 pages.
Huawei, et al. "NR DCI and UCI design for resource allocation mode 1" 3GPP TSG RAN WG1 Meeting #98, R1-1909315, Aug. 2019, 7 pages.

* cited by examiner

METHOD AND APPARATUS FOR USING SIDELINK BANDWIDTH PART

CROSS-REFERENCE TO RELATED APPLICATION

The present application is a continuation application of PCT application No. PCT/CN2019/109369, filed on Sep. 30, 2019, the entire contents of which are incorporated herein by reference.

TECHNICAL FIELD

The present disclosure relates to the field of communications, and in particular, to a method and an apparatus for using a sidelink bandwidth part.

BACKGROUND

Vehicle wireless communication technology (Vehicle to Everything, V2X) is a new generation of information communication technology that connects the vehicle with everything, where V represents the vehicle, and X represents any object that interacts with the vehicle. Currently, X mainly includes vehicles, people, traffic roadside infrastructure and networks. The information modes of V2X interaction include: interactions between Vehicle to Vehicle (V2V), Vehicle to Infrastructure (V2I), Vehicle to Pedestrian (V2P), and Vehicle to Network (V2N).

In the fifth-generation mobile communication technology (5th-Generation, 5G), there is no reasonable solution for the switching mode between sidelink communication and uplink communication.

SUMMARY

Embodiments of the present disclosure provide a method and an apparatus for using a sidelink bandwidth part.

In an aspect, a method for using a sidelink bandwidth part is provided. The method is implemented by a terminal and includes:
 receiving a configuration signaling, in which the configuration signaling includes a first information field, and the first information field is configured to indicate a time domain resource location corresponding to a sidelink resource pool; and
 using the sidelink bandwidth part at the time domain resource location.

In another aspect, a method for using a sidelink bandwidth part is provided. The method is implemented by an access network device and includes:
 sending a configuration signaling to a terminal, in which the configuration signaling includes a first information field, and the first information field is configured to indicate a time domain resource location corresponding to a sidelink resource pool, and the terminal is configured to use the sidelink bandwidth part at the time domain resource location based on the configuration signaling.

In another aspect, a terminal is provided. The terminal includes:
 a processor;
 a transceiver connected to the processor;
 the processor is configured to load and execute executable instructions to implement a method for using a sidelink bandwidth part. The method includes: receiving a configuration signaling, in which the configuration signaling includes a first information field, and the first information field is configured to indicate a time domain resource location corresponding to a sidelink resource pool; and using the sidelink bandwidth part at the time domain resource location.

BRIEF DESCRIPTION OF THE DRAWINGS

In order to illustrate the technical solutions in the embodiments of the present disclosure more clearly, the following briefly introduces the drawings that are used in the description of the embodiments. Obviously, the drawings in the following description are only some embodiments of the present disclosure. For those of ordinary skill in the art, other drawings can also be obtained from these drawings without creative effort.

DETAILED DESCRIPTION

In order to make the objectives, technical solutions and advantages of the present disclosure clearer, embodiments of the present disclosure will be further described in detail below with reference to the accompanying drawings.

The beneficial effects brought by the technical solutions provided in the embodiments of the present disclosure include at least the following.

The switching between the sidelink bandwidth part and the uplink bandwidth part in the uplink time-domain resources may be performed by using the sidelink bandwidth part in the configured sidelink resource pool.

Figure 1:
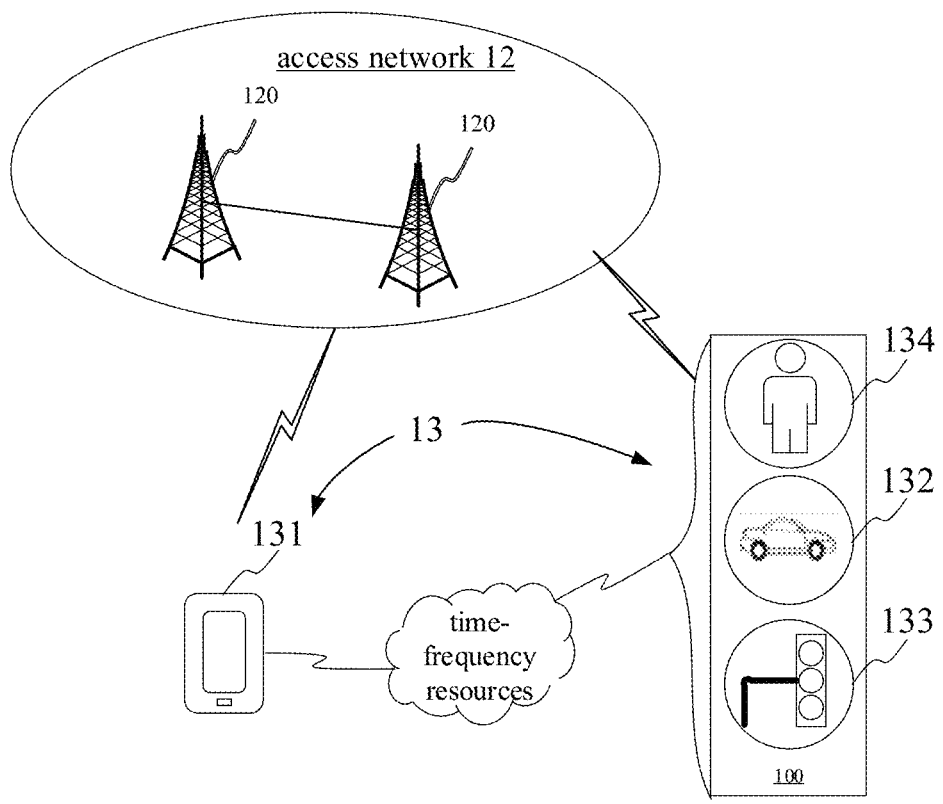
FIG. 1 shows a block diagram of a communication system supporting a sidelink communication provided by an exemplary embodiment of the present disclosure.

FIG. 1 shows a block diagram of a communication system supporting a sidelink communication provided by an exemplary embodiment of the present disclosure. The communication system may include: an access network 12 and a terminal 13.

The access network 12 includes several access network devices 120. The access network device 120 may be a base station, and the base station is a device deployed in an access network to provide a wireless communication function for a terminal. The base station may include various forms of macro base station, micro base station, relay station, access point and so on. In systems using different radio access technologies, the names of devices with base station functions may be different, for example, in Long Term Evolution (LTE) systems, they are called eNodeB or eNB; in 5G new air interface (New Radio, NR) system, called gNodeB or gNB. With the evolution of communication technology, the name "base station" may be descriptive and will change. For the convenience of the embodiments of the present disclosure, the above-mentioned apparatuses for providing a wireless communication function for a terminal are collectively referred to as an access network device.

The terminal 13 may include various handheld devices with wireless communication functions, vehicle-mounted devices, wearable devices, computing devices or other processing devices connected to the wireless modem, as well as various forms of terminals (User Equipment, UE), mobile stations (MS), terminal devices, etc. For the convenience of description, the devices mentioned above are collectively referred to as terminals. The access network device 120 and the terminal 13 communicate with each other through a certain radio technique, such as a Uu interface.

In this embodiment of the present disclosure, the terminal 13 includes: a vehicle 131, other vehicles 132, infrastructure 133 and pedestrians 134.

Vehicle to Vehicle (V2V) refers to a communication between the vehicle 131 and other vehicles 132. A vehicle sends relevant information of the vehicle to another vehicle. The relevant information includes a driving speed, a geographic location, a driving direction and a driving status, etc.

Vehicle to Infrastructure (V2I) refers to a communication between the vehicle 131 and the infrastructure 133, and the infrastructure 133 includes all the infrastructure encountered by the vehicle during driving, including facilities such as traffic lights, bus stops, buildings, and tunnels.

Vehicle to Pedestrian (V2P) refers to a communication between the vehicle 131 and the pedestrian 134. Pedestrian generally refers to electronic devices with mobile communication capabilities carried by pedestrians, such as mobile phones and wearable devices, wearable devices include smart bracelets, smart watches, and smart rings.

In embodiments of the present disclosure, the vehicle 131 is referred to as a first terminal, and other vehicles 132, infrastructure 133, and pedestrians 134 are referred to as a second terminal for illustration, but the roles of the two can also be interchanged, which is not limited here.

Optionally, the above-mentioned first terminal and the second terminal are both terminals that support the sidelink communication, and the above-mentioned communication system may be an NR system or a subsequent evolution system.

In the NR system, the concept of BandWith Part (BWP) is introduced in the design of uplink and downlink communication. A BWP is configured to represent a continuous frequency domain resource block (RB) at a given subcarrier interval on a given carrier frequency. In the design of NR uplink communication, each UE can be configured with up to four uplink BWPs on a given carrier, but only one of them can be activated at the same time.

Optionally, in the LTE V2x system, the sidelink communication transmission can only transmit time-frequency resources through the uplink. In the frequency division duplex (FDD) system, the time-frequency resources of the sidelink communication are in the uplink frequency band.

Figure 2:
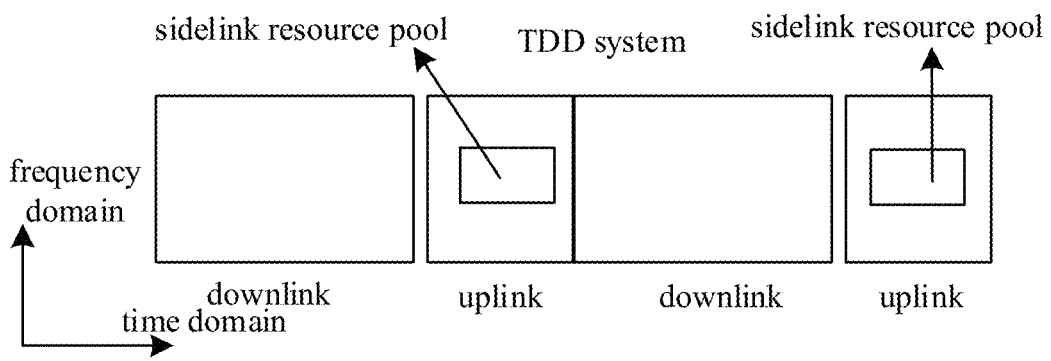
FIG. 2 shows a schematic diagram of a configuration manner of a sidelink resource pool in an LTE system provided by an exemplary embodiment of the present disclosure.

Illustratively, taking the TDD system as an example, in the LTE system, the configuration of the sidelink resource pool is as shown in FIG. 2.

Optionally, in the NR TDD system, the allocation of uplink and downlink time resources is determined by a slot format, the slot format includes a downlink time domain symbol (DL symbol), an uplink time domain symbol (UL symbol) and a flexible symbol (flexible symbol). The time slot format can be configured in a semi-static manner, or the time slot format can be indicated through downlink dynamic signaling, such as: through downlink DCI signaling, the 14 symbols in the time slot format are indicated as the format of DDXXUUUDDXXUUU, where D is a downlink time domain symbol, U is an uplink time domain symbol, and X is a flexible time domain symbol.

However, when the UE supports both the sidelink transmission and the uplink transmission, and the uplink transmission and the sidelink transmission use frequency domain multiplexing resources, the UE can perform the uplink transmission in the uplink frequency domain resource in the uplink time domain symbol, or perform the sidelink transmission in the sidelink frequency domain resources in the uplink time domain symbol, the activated uplink BWP needs to be used for uplink transmission, and the sidelink BWP needs to be used for sidelink transmission, and UE needs to perform activation in the activated uplink BWP and the sidelink BWP. When the user activates the uplink BWP, the sidelink transmission cannot be performed. On the contrary, when the user uses the sidelink BWP, the uplink transmission cannot be performed. Therefore, the embodiments of the present disclosure provides a method for using the sidelink BWP, which aims to determine switching between the uplink transmission and the sidelink transmission.

Figure 3:
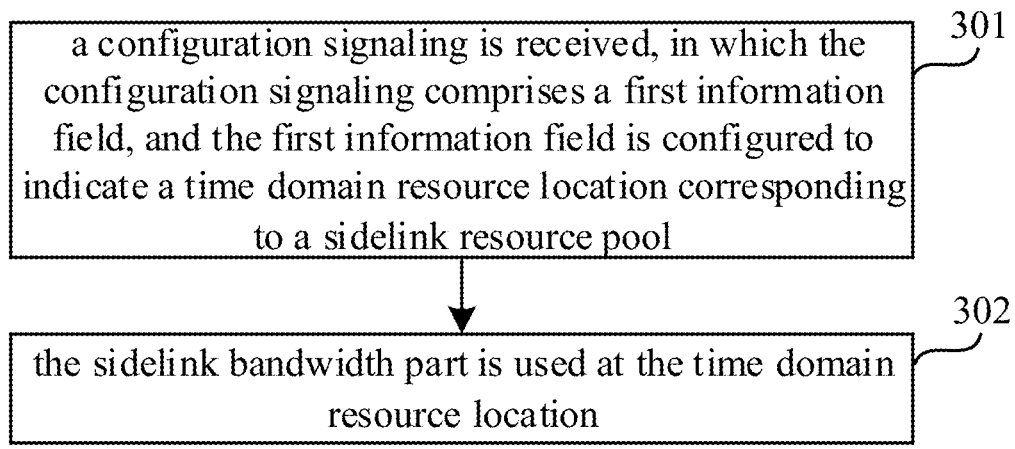
FIG. 3 shows a flowchart of a method for using a sidelink bandwidth part provided by an exemplary embodiment of the present disclosure.

FIG. 3 shows a flowchart of a method for using a sidelink bandwidth part provided by an exemplary embodiment of the present disclosure. The method is applied to a user terminal as an example for description. As shown in FIG. 3, the method includes the following.

At step 301, a configuration signaling is received, in which the configuration signaling includes a first information field, and the first information field is configured to indicate a time domain resource location corresponding to a sidelink resource pool.

Optionally, the configuration signaling includes any of radio resource control (Radio Resource Control, RRC) signaling, media access control control element (Media Access Control Element, MAC CE), downlink control information (Downlink Control Information, DCI).

Optionally, the configuration signaling includes a first information field for indicating a time domain resource location corresponding to a sidelink resource pool. Optionally, the first information field is configured to indicate, within the uplink time domain resource, the time domain resource location corresponding to the sidelink resource pool.

Optionally, the configuration instruction may be downlink control information received by the terminal and sent by the access network device, or may be a pre-configured instruction obtained by the terminal from its own memory.

At step 302, the sidelink bandwidth part is used at the time domain resource location.

Optionally, time domain resources of the sidelink bandwidth part are divided with a resource division granularity, and the resource division granularity includes any one of: an Orthogonal Frequency Division Multiplexing (OFDM) symbol, a time slot, a subframe, a radio frame, a microsecond, a millisecond, and a second, or other division granularity, which is not limited in embodiments of the present disclosure.

Optionally, the resource division granularity of the time domain resources of the sidelink bandwidth part is the same as or different from the time domain granularity of the sidelink time-frequency resources configured in the sidelink resource pool.

Figure 4:
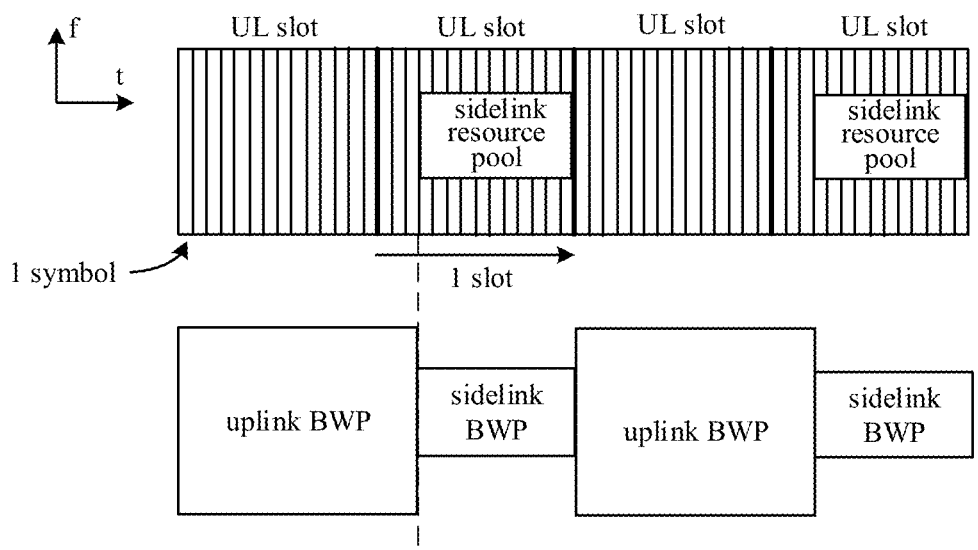
FIG. 4 shows a schematic diagram of switching between an uplink bandwidth part and a sidelink bandwidth part provided by an exemplary embodiment of the present disclosure.

Illustratively, please refer to FIG. 4, which shows a schematic diagram of switching the uplink bandwidth part and the sidelink bandwidth part according to the time domain resource location of the sidelink resource pool provided by an exemplary embodiment of the present disclosure, as shown in FIG. 4, the sidelink bandwidth part 410 is used at the time domain resource location corresponding to the sidelink resource pool 400, and the uplink bandwidth part 420 is activated at other time domain resource locations.

Optionally, as shown in the embodiment shown in FIG. 4, a subcarrier spacing of the sidelink bandwidth part is the same as a subcarrier spacing of the uplink bandwidth part, and the length of a cyclic prefix (CP) of the sidelink bandwidth part is the same as that of a cyclic prefix of the uplink bandwidth part.

Figure 5:
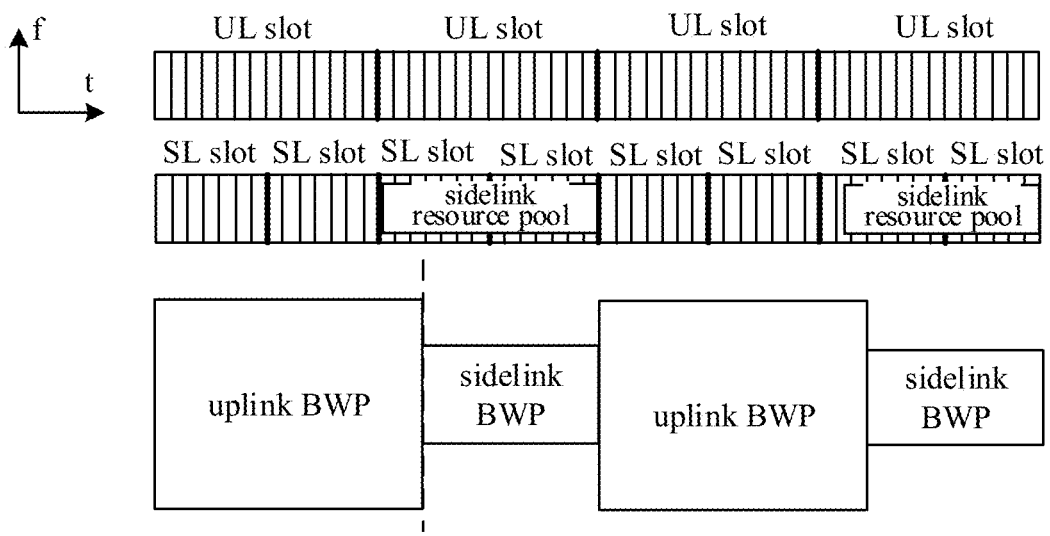
FIG. 5 shows a schematic diagram of switching between an uplink bandwidth part and a sidelink bandwidth part provided by another exemplary embodiment of the present disclosure.

In an optional embodiment, the subcarrier spacing of the sidelink bandwidth part and the subcarrier spacing of the uplink bandwidth part are different, and the length of the cyclic prefix of the sidelink bandwidth part and that of the cyclic prefix of the uplink bandwidth part are different. Illustratively, please refer to FIG. 5.

To sum up, the method for using the sidelink bandwidth part provided in this embodiment uses the sidelink bandwidth part at the time domain resource location corresponding to the sidelink resource pool obtained by configuration, instead of using the uplink bandwidth part, thereby realizing the switching between sidelink communication and uplink communication.

In an optional embodiment, the uplink transmission may also be performed in the time domain resources using the sidelink bandwidth part, when uplink transmission is performed in the time domain resources using the sidelink bandwidth part, there are two cases: one is that there is no time domain conflict between the uplink transmission and the sidelink transmission, the other is that there is a time domain conflict between the uplink transmission and the sidelink transmission.

Figure 6:
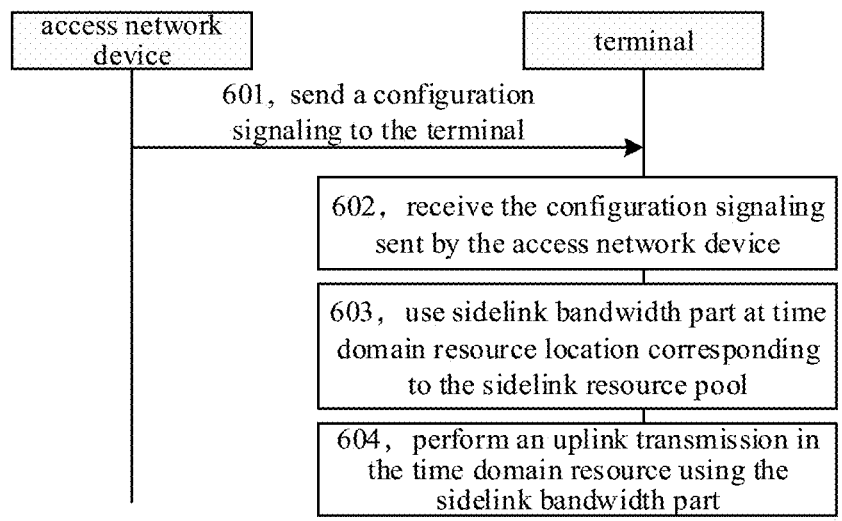
FIG. 6 shows the flowchart of a method for using a sidelink bandwidth part provided by another exemplary embodiment of the present disclosure.

FIG. 6 is a flowchart of a method for using a sidelink bandwidth part provided by an exemplary embodiment of the present disclosure. The method is applied between an access network device and a terminal as an example for illustration. As shown in FIG. 6, the method includes the following.

At step 601, the access network device sends a configuration signaling to the terminal.

Optionally, the configuration signaling includes a first information field, and the first information field is configured to indicate a time domain resource location corresponding to a sidelink resource pool.

Optionally, the configuration signaling includes: at least one of a radio resource control (RRC) signaling, a medium access control control unit (MAC CE) or a physical layer signaling.

At step 602, the terminal receives the configuration signaling sent by the access network device.

Optionally, the configuration signaling may also be a pre-configured instruction acquired by the terminal from its own memory.

At step 603, the terminal uses the sidelink bandwidth part at the time domain resource location corresponding to the sidelink resource pool.

At step 604, the terminal performs an uplink transmission in the time domain resource using the sidelink bandwidth part.

Optionally, the uplink transmission includes at least one of: physical uplink shared channel (PUSCH) transmission, physical uplink control channel (PUCCH) transmission and physical random access channel (PRACH) transmission, in which the PUSCH transmission may be a transmission scheduled by downlink control information (DCI), or may be a transmission configured by downlink RRC signaling. Optionally, the PUSCH transmission or PUCCH transmission includes physical layer uplink control signaling such as: Hybrid Automatic Repeat Request (HARD), Scheduling Request (SR), Channel State Information (SCI), etc.

Optionally, when the UE performs uplink transmission using the time domain resources of the sidelink bandwidth part, the uplink transmission may be performed by using the frequency resources in the sidelink bandwidth part that are in the same location as the uplink transmission in the activated uplink bandwidth part, or by using the frequency resources of the sidelink bandwidth part.

First, the uplink transmission is performed by using the frequency resources in the sidelink bandwidth part that are in the same location as the uplink transmission in the activated uplink bandwidth part.

Optionally, the frequency resources in the activated uplink bandwidth part of the uplink transmission are within the frequency domain range corresponding to the sidelink bandwidth part.

Optionally, the subcarrier spacing and CP length corresponding to the uplink bandwidth part are the same as the subcarrier spacing and CP length corresponding to the sidelink bandwidth part.

Optionally, the subcarrier intervals and CP lengths corresponding to the uplink bandwidth part and the sidelink bandwidth part activated by the UE are the same as scheduled by the access network device, and the frequency resources of the scheduled uplink transmission in the activated uplink bandwidth part are in the frequency domain range corresponding to the sidelink bandwidth part. Optionally, when the subcarrier spacing and CP length corresponding to the uplink bandwidth part activated by the UE and the sidelink bandwidth part are different, or the frequency resources used for uplink transmission are not completely within the frequency domain resource range corresponding to the sidelink bandwidth part, the upstream transmission is discarded.

Second, the uplink transmission is performed by using the frequency resources of the sidelink bandwidth part.

Illustratively, taking the uplink transmission as the PUSCH transmission scheduled by the base station through DCI as an example, the UE receives the downlink control information sent by the access network device, and the downlink control information is used to schedule the terminal to perform uplink transmission. The UE performs the uplink transmission in the time domain resources using the sidelink bandwidth part according to the DCI. Optionally, the DCI includes a second information field for indicating a manner of performing the frequency domain resource allocation. Optionally, when instructing according to the sidelink bandwidth part, if the number of bits in the information field is less than the number of bits instructed according to the activated uplink bandwidth part, add 0 in the information field to keep the size of the information field; when instructing according to the sidelink bandwidth part, if the number of bits in the information field is greater than the number of bits indicated according to the activated uplink bandwidth part, the extra information bits are placed in the DCI end field.

Optionally, the DCI includes a second information field for indicating a manner of performing the frequency domain resource allocation, or the DCI does not include a second information field for indicating a manner of performing the frequency domain resource allocation. That is, the DCI includes a second information field configured to indicate whether to use the uplink bandwidth part or the sidelink bandwidth part for frequency domain resource allocation, or it may not include the explicit indication, and the UE may judge by using the time domain resource allocation field in the received DCI.

Optionally, when the uplink transmission is uplink PUCCH transmission, a PUCCH resource set is configured on the sidelink bandwidth part, and a PUCCH resource may be selected from the PUCCH resource set configured in the sidelink bandwidth part according to the existing method for selecting PUCCH resources in NR.

Optionally, when the uplink transmission is the uplink transmission configured by the RRC signaling, the configured grant uplink transmission resource is configured in the sidelink bandwidth part, so that the UE can perform the uplink transmission configured by the RRC signaling in the sidelink bandwidth part.

Optionally, different frequency domain resource allocation modes or the same frequency domain resource allocation mode may be used for different uplink transmissions.

Figure 7:
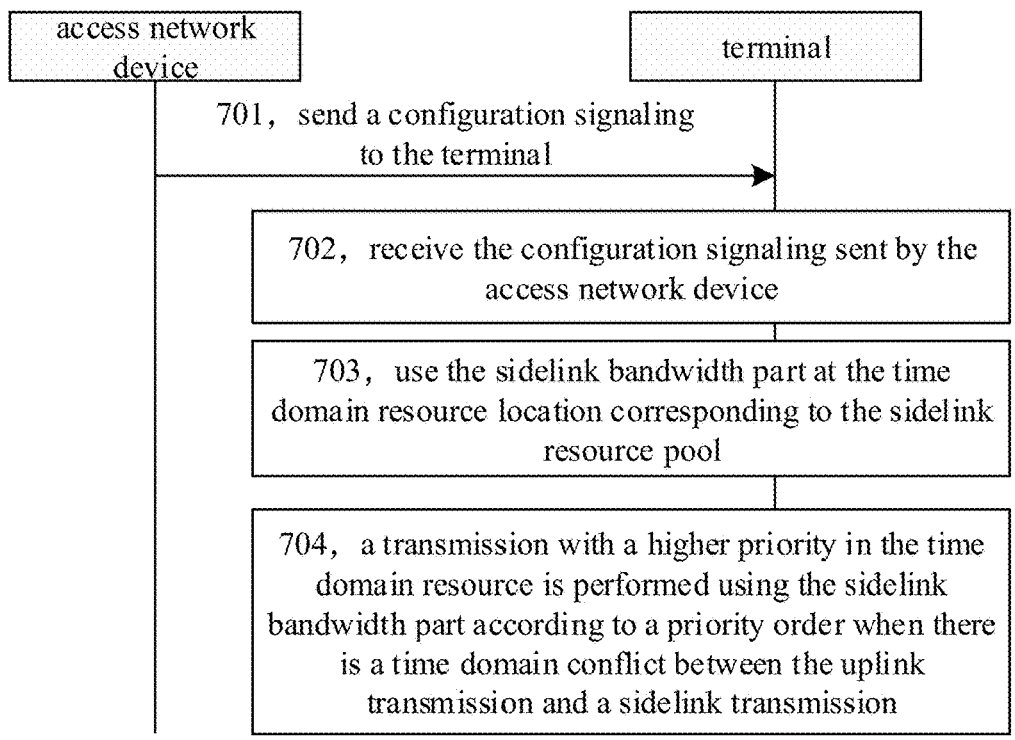
FIG. 7 shows a flowchart of a method for using a sidelink bandwidth part provided by another exemplary embodiment of the present disclosure.

Optionally, a transmission is determined in the sidelink bandwidth part according to a priority order when there is a time domain conflict between uplink transmission and sidelink transmission. FIG. 7 shows a flowchart of a method for using a sidelink bandwidth part provided by another exemplary embodiment of the present disclosure. The flowchart of the method is described by taking the method applied between an access network device and a terminal as an example. As shown in FIG. 7, the method includes the following.

At step 701, the access network device sends a configuration signaling to the terminal.

Optionally, the configuration signaling includes a first information field, the configuration signaling includes a first information field, and the first information field is configured to indicate a time domain resource location corresponding to a sidelink resource pool.

Optionally, the configuration signaling includes: at least one of a radio resource control (RRC) signaling, a medium access control control unit (MAC CE) or a physical layer signaling.

At step 702, the terminal receives the configuration signaling sent by the access network device.

Optionally, the configuration signaling may also be a pre-configured instruction acquired by the terminal from its own memory.

At step 703, the terminal uses the sidelink bandwidth part at the time domain resource location corresponding to the sidelink resource pool.

At step 704, a transmission with a higher priority in the time domain resource using the sidelink bandwidth part is performed according to a priority order when there is a time domain conflict between the uplink transmission and a sidelink transmission. In other words, a transmission in the time domain resource using the sidelink bandwidth part is performed according to a priority order in a descending order when there is a time domain conflict between the uplink transmission and a sidelink transmission.

Optionally, the uplink transmission includes PUSCH transmission, PUCCH transmission, PRACH transmission, etc., and the sidelink transmission includes: sidelink transmission operations such as sidelink data transmission, sidelink control information transmission, sidelink feedback information transmission, sidelink synchronization signal transmission and the like; and sidelink receiving operations such as sidelink control information busy detection, time-frequency resource monitoring, and sidelink information measurement and the like.

Optionally, a priority order is included between the above-mentioned uplink transmission and sidelink transmission, the priority order is a sequence relationship predefined in the UE, or the priority order is a sequence relationship configured by the access network device.

Illustratively, the priority relationship may be: a priority of uplink transmission is higher than a priority of the sidelink sending operation, and the priority of the sidelink sending operation is higher than a priority of the sidelink receiving operation; or, the above-mentioned sidelink sending operation may be divided into a first-level sidelink sending operation and a second-level sidelink sending operation. The priority relationship is as follows: the priority of the first-level sidelink sending operation is higher than that of uplink transmission, and the priority of uplink transmission is higher than that of the second-level sidelink sending operation, the priority of the second-level sidelink sending operation is higher than that of the sidelink receiving operation.

To sum up, with the method for using the sidelink bandwidth part provided in the embodiment, the sidelink bandwidth part is correspondingly used in the uplink time domain resources according to the sidelink resource pool obtained according to the configuration, so that the switching between the sidelink transmission and the upstream transmissions is performed in the uplink time domain resources.

In the method provided by the embodiments, when conditions are met, uplink transmission is performed in the time domain resources using the sidelink bandwidth part, so as to avoid the delay caused by the sidelink resource configuration when the emergency service needs uplink transmission.

Figure 8:
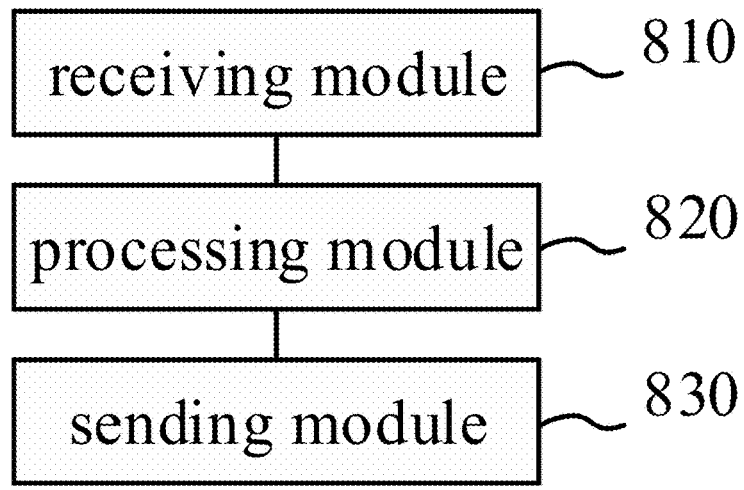
FIG. 8 shows a structural block diagram of an apparatus for using a sidelink bandwidth part provided by an exemplary embodiment of the present disclosure.

FIG. 8 shows a structural block diagram corresponding to an apparatus for using a sidelink bandwidth part provided by an exemplary embodiment of the present disclosure. The apparatus is applied to a terminal as an example for illustration. As shown in FIG. 8, the apparatus includes the following.

A receiving module 810 is configured to receive a configuration signaling, in which the configuration signaling includes a first information field, and the first information field is configured to indicate a time domain resource location corresponding to a sidelink resource pool.

A processing module 820 is configured to use the sidelink bandwidth part at the time domain resource location.

In an optional embodiment, time domain resources of the sidelink bandwidth part are divided with a resource division granularity; and the resource division granularity includes one of: a OFDM symbol, a time slot, a subframe, a radio frame, a microsecond, a millisecond, and a second.

In an optional embodiment, the configuration signaling includes: at least one of a radio resource control (RRC) signaling, a medium access control control unit (MAC CE) or a physical layer signaling.

In an optional embodiment, the apparatus also includes the following.

A sending module 830 is configured to perform an uplink transmission in the time domain resources using the sidelink bandwidth part.

In an optional embodiment, the uplink transmission includes at least one of:
 a physical uplink shared channel PUSCH transmission;
 a physical uplink control channel PUCCH transmission; and
 a physical random access channel PRACH transmission.

In an optional embodiment, the sending module 830 is configured to perform the uplink transmission using frequency resources in the sidelink bandwidth part at a same location of frequency resources of the uplink transmission in an uplink bandwidth part activated.

In an optional embodiment, a subcarrier spacing and a cyclic prefix length corresponding to the uplink bandwidth part are the same as a subcarrier spacing and a cyclic prefix length corresponding to the sidelink bandwidth part.

In an optional embodiment, the frequency resource of the uplink transmission in the uplink bandwidth part activated is within a frequency domain range corresponding to the sidelink bandwidth part.

In an optional embodiment, the uplink transmission includes a physical uplink shared channel PUSCH transmission scheduled by downlink control information, and
 the sending module 810 is also configured to receive downlink control information sent by an access network device, in which the downlink control information is configured to schedule the terminal to perform the uplink transmission;
 the sending module 830 is configured to perform the uplink transmission in the time domain resource using the sidelink bandwidth part according to the downlink control information;
 the downlink control information is configured to perform frequency resource allocation for the uplink transmission according to the uplink bandwidth part activated; or, the downlink control information is configured to perform frequency resource allocation for the uplink transmission according to the sidelink bandwidth part.

In an optional embodiment, the downlink control information includes a second information field configured to indicate a manner of performing the frequency domain resource allocation.

In an optional embodiment, the processing module 820 is configured to perform a transmission with a higher priority in the time domain resource using the sidelink bandwidth part according to a priority order when there is a time domain conflict between the uplink transmission and a sidelink transmission. In other words, a transmission in the time domain resource using the sidelink bandwidth part is performed according to a priority order in a descending order when there is a time domain conflict between the uplink transmission and a sidelink transmission.

In an optional embodiment, the priority order is a sequence relationship predefined in the terminal, or, the priority order is a sequence relationship configured by an access network device.

Figure 9:
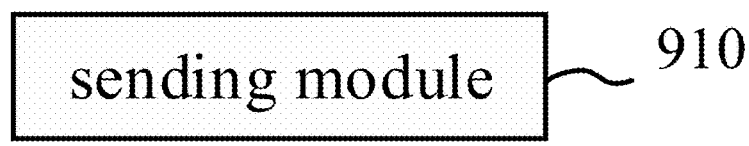
FIG. 9 shows a structural block diagram of an apparatus for using a sidelink bandwidth part provided by another exemplary embodiment of the present disclosure.

FIG. 9 is a structural block diagram of an apparatus for using sidelink communication provided by an exemplary embodiment of the present disclosure. The apparatus is applied to an access network device as an example for description. The apparatus includes the following.

A sending module 910 is configured to send a configuration signaling to a terminal, in which the configuration signaling includes a first information field, and the first information field is configured to indicate a time domain resource location corresponding to a sidelink resource pool, and the terminal is configured to use the sidelink bandwidth part at the time domain resource location based on the configuration signaling.

In an optional embodiment, time domain resources of the sidelink bandwidth part are divided with a resource division granularity; and the resource division granularity includes one of: a OFDM symbol, a time slot, a subframe, a radio frame, a microsecond, a millisecond, and a second.

In an optional embodiment, the configuration signaling includes: at least one of a radio resource control (RRC) signaling, a medium access control control unit (MAC CE) or a physical layer signaling.

In an optional embodiment, the sending module 910 is configured to send downlink control information to the terminal, in which the downlink control information is configured to schedule the terminal to perform an uplink transmission, and the terminal performs the uplink transmission within the time domain resources using the sidelink bandwidth part according to the downlink control information.

In an optional embodiment, the downlink control information is configured to perform frequency resource allocation for the uplink transmission according to the uplink bandwidth part activated, or,
 the downlink control information is configured to perform frequency resource allocation for the uplink transmission according to the sidelink bandwidth part.

In an optional embodiment, the downlink control information includes a second information field configured to indicate a manner of performing the frequency domain resource allocation.

In an optional embodiment, the sending module 910 is configured to send a downlink configuration signaling to the terminal, in which the downlink configuration signaling includes a third information field configured to indicate a priority order, the terminal is configured to perform a transmission with a higher priority in the time domain resource using the sidelink bandwidth part according to a priority order when there is a time domain conflict between the uplink transmission and a sidelink transmission. In other words, a transmission in the time domain resource using the sidelink bandwidth part is performed according to a priority order in a descending order when there is a time domain conflict between the uplink transmission and a sidelink transmission.

Figure 10:
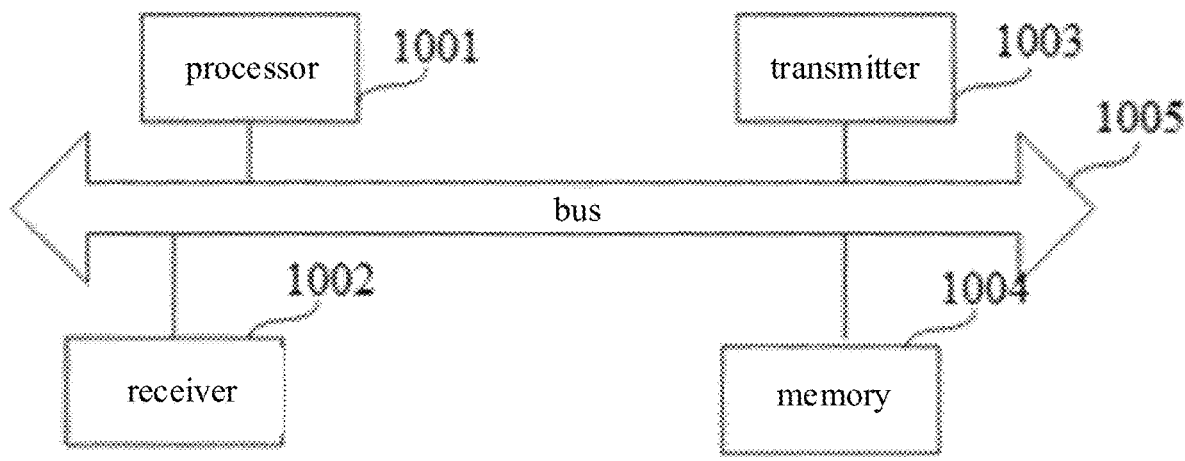
FIG. 10 is a block diagram of a terminal provided by an exemplary embodiment of the present disclosure.

FIG. 10 shows a schematic structural diagram of a terminal provided by an exemplary embodiment of the present disclosure. The terminal includes: a processor 1001, a receiver 1002, a transmitter 1003, a memory 1004 and a bus 1005.

The processor 1001 includes one or more processing cores, and the processor 1001 executes various functional applications and information processing by running software programs and modules.

The receiver 1002 and the transmitter 1003 may be implemented as a communication component, which may be a communication chip.

The memory 1004 is connected to the processor 1001 via the bus 1005.

The memory 1004 may be configured to store at least one instruction, and the processor 1001 may be configured to execute the at least one instruction to implement various steps in the above method embodiments.

Additionally, memory 1004 may be implemented by any type or combination of volatile or non-volatile storage devices including, but not limited to, magnetic or optical disks, electrically erasable programmable Read Only Memory (EEPROM), Erasable Programmable Read Only Memory (EPROM), Static Anytime Access Memory (SRAM), Read Only Memory (ROM), Magnetic Memory, Flash Memory, Programmable Read Only Memory (PROM).

In an exemplary embodiment, a non-transitory computer-readable storage medium including instructions, such as a memory including instructions, is also provided, and the instructions can be executed by the processor of the terminal to complete the above-mentioned method of using a sidelink bandwidth part executed on the terminal side. For example, the non-transitory computer-readable storage medium may be ROM, random access memory (RAM), CD-ROM, magnetic tape, floppy disk, optical data storage device, and the like.

A non-transitory computer-readable storage medium is provided, when instructions in the non-transitory computer storage medium are executed by the processor of the terminal, the terminal can execute the above-mentioned method for using the sidelink bandwidth part.

Figure 11:
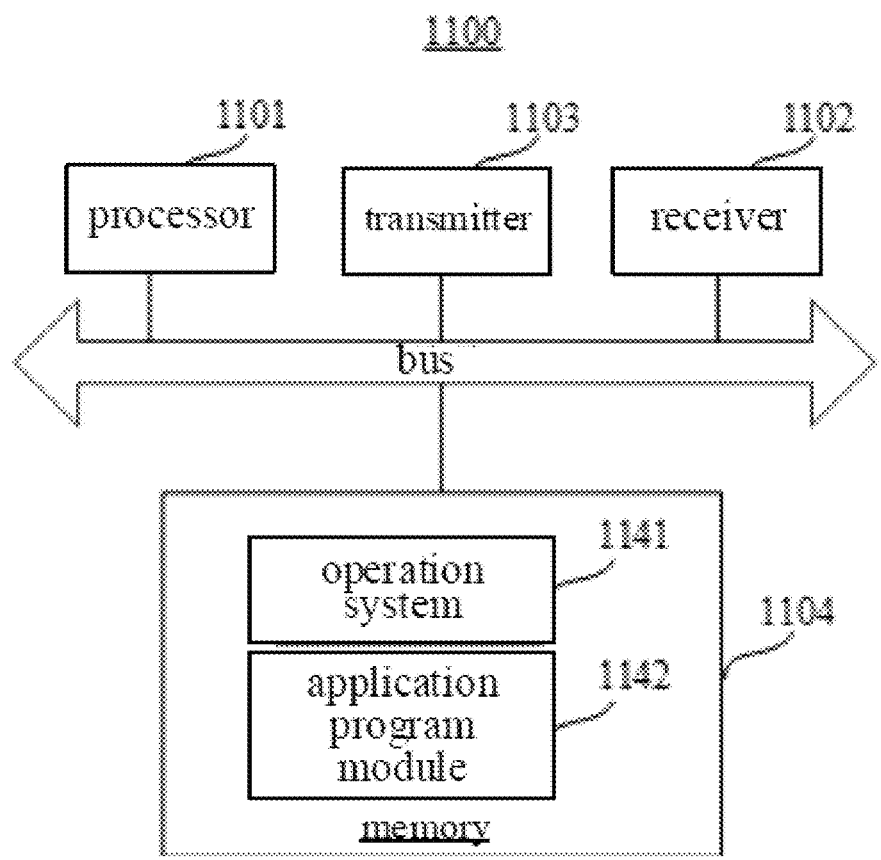
FIG. 11 is a block diagram of an access network device provided by an exemplary embodiment of the present disclosure.

FIG. 11 is a block diagram of an access network device 1100 according to an exemplary embodiment. The access network device 1100 may be a base station.

The access network device 1100 may include: a processor 1101, a receiver 1102, a transmitter 1103 and a memory 1104. The receiver 1102, the transmitter 1103 and the memory 1104 are respectively connected to the processor 1101 through a bus.

The processor 1101 includes one or more processing cores, and the processor 1101 executes the method performed by the access network device in the methods for using the sidelink bandwidth part provided by the embodiments of the present disclosure by running software programs and modules. The memory 1104 may be used to store software programs and modules. Specifically, the memory 1104 can store the operating system 1141 and the application program module 1142 required for at least one function. The receiver 1102 is used for receiving communication data sent by other devices, and the transmitter 1103 is used for sending communication data to other devices.

An exemplary embodiment of the present disclosure also provides a system (or a communication system) for using a sidelink bandwidth part, the system includes: a terminal and an access network device.

The terminal includes the apparatus for using a sidelink bandwidth part provided by the embodiment shown in FIG. 8.

The access network device includes the apparatus for using the sidelink bandwidth part provided by the embodiment shown in FIG. 9.

An exemplary embodiment of the present disclosure also provides a system (or a communication system) for using a sidelink bandwidth part, and the system includes: a terminal and an access network device.

The terminal includes the terminal provided by the embodiment shown in FIG. 10.

The access network device includes the access network device provided in the embodiment shown in FIG. 11.

An exemplary embodiment of the present disclosure further provides a computer-readable storage medium, where at least one instruction, at least one piece of program, code set or instruction set are stored in the computer-readable storage medium, the at least one instruction, the at least one piece of program, the code set or the instruction set is loaded and executed by a processor to implement the above-mentioned method for using the sidelink bandwidth part executable by the terminal or the access network device.

It should be understood that references herein to "a plurality" means two or more. "And/or", which describes the association relationship of the associated objects, means that there can be three kinds of relationships, for example, A and/or B, which can mean: A, A and B exist simultaneously, and B. The character "/" generally indicates that the associated objects are an "or" relationship.

Other embodiments of the present disclosure will readily occur to those skilled in the art upon consideration of the specification and practice of the invention disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for using a sidelink bandwidth part, implemented by a terminal and comprising:
   receiving a configuration signaling, wherein the configuration signaling comprises a first information field, and the first information field is configured to indicate a time domain resource location corresponding to a sidelink resource pool;
   using the sidelink bandwidth part at the time domain resource location;
   performing an uplink transmission within the time domain resources using the sidelink bandwidth part; and
   in response to frequency resources used for the uplink transmission being not completely within a frequency domain resource range corresponding to the sidelink bandwidth part, discarding the uplink transmission.

2. The method of claim 1, wherein time domain resources of the sidelink bandwidth part are divided with a resource division granularity; and
   the resource division granularity comprises at least one of:
   (i) an OFDM symbol, (ii) a time slot, (iii) a subframe, (iv) a radio frame, (v) a microsecond,
   (vi) a millisecond, and (vii) a second.

3. The method of claim 1, wherein, the configuration signaling comprises at least one of:
   (a) a radio resource control (RRC) signaling,
   (b) a medium access control control unit (MAC CE) and
   (c) a physical layer signaling.

4. The method of claim 1, wherein the uplink transmission comprises at least one of:
   (x) a physical uplink shared channel PUSCH transmission;
   (y) a physical uplink control channel PUCCH transmission; and (z) a physical random access channel PRACH transmission.

5. The method of claim 4, wherein the uplink transmission comprises a physical uplink shared channel PUSCH transmission scheduled by downlink control information; and
performing the uplink transmission in the time domain resources using the sidelink bandwidth part comprises:
receiving downlink control information sent by an access network device, wherein the downlink control information is configured to schedule the terminal to perform the uplink transmission;
performing the uplink transmission in the time domain resource using the sidelink bandwidth part according to the downlink control information;
wherein, the downlink control information is configured to perform frequency domain resource allocation for the uplink transmission according to an uplink bandwidth part activated; or, the downlink control information is configured to perform frequency domain resource allocation for the uplink transmission according to the sidelink bandwidth part.

6. The method of claim 5, wherein the downlink control information comprises a second information field configured to indicate a manner of performing the frequency domain resource allocation.

7. The method of claim 1, further comprising:
performing a transmission in the time domain resource using the sidelink bandwidth part according to a priority order in a descending order when there is a time domain conflict between the uplink transmission and a sidelink transmission.

8. The method of claim 7, wherein,
the priority order is a sequence relationship predefined in the terminal;
or,
the priority order is a sequence relationship configured by an access network device.

9. The method of claim 8, wherein the priority order is: a priority of a first-level sidelink sending operation is higher than a priority of the uplink transmission, the priority of the uplink transmission is higher than a priority of a second-level sidelink sending operation, and the priority of the second-level sidelink sending operation is higher than a priority of a sidelink receiving operation.

10. A method for using a sidelink bandwidth part, implemented by an access network device and comprising:
sending a configuration signaling to a terminal, wherein the configuration signaling comprises a first information field, and the first information field is configured to indicate a time domain resource location corresponding to a sidelink resource pool, and the terminal is configured to use the sidelink bandwidth part at the time domain resource location based on the configuration signaling, and the terminal is configured to perform an uplink transmission within the time domain resources using the sidelink bandwidth part, and in response to frequency resources used for the uplink transmission being not completely within a frequency domain resource range corresponding to the sidelink bandwidth part, the terminal discards the uplink transmission.

11. The method of claim 10, wherein, time domain resources of the sidelink bandwidth part are divided with a resource division granularity; and
the resource division granularity comprises at least one of:
(i) a OFDM symbol, (ii) a time slot, (iii) a subframe, (iv) a radio frame, (v) a microsecond, (vi) a millisecond, and (vii) a second.

12. The method of claim 10, wherein the configuration signaling comprises: at least one of
(a) a radio resource control (RRC) signaling,
(b) a medium access control control unit (MAC CE) and
(c) a physical layer signaling.

13. The method of claim 10, further comprising:
sending downlink control information to the terminal, wherein the downlink control information is configured to schedule the terminal to perform the uplink transmission within the time domain resources using the sidelink bandwidth part according to the downlink control information.

14. The method of claim 13, wherein the downlink control information is configured to perform frequency domain resource allocation for the uplink transmission according to an uplink bandwidth part activated;
or,
the downlink control information is configured to perform frequency domain resource allocation for the uplink transmission according to the sidelink bandwidth part.

15. The method of claim 13, wherein the downlink control information comprises a second information field configured to indicate a manner of performing frequency domain resource allocation.

16. The method of claim 10, further comprising:
sending a downlink configuration signaling to the terminal, wherein the downlink configuration signaling comprises a third information field configured to indicate a priority order, the terminal is configured to perform a transmission in the time domain resource using the sidelink bandwidth part according to a priority order in a descending order when there is a time domain conflict between the uplink transmission and a sidelink transmission.

17. A terminal, comprising:
a processor;
a transceiver connected to the processor;
wherein, the processor is configured to load and execute executable instructions to implement a method for using a sidelink bandwidth part, the method comprises:
receiving a configuration signaling, wherein the configuration signaling comprises a first information field, and the first information field is configured to indicate a time domain resource location corresponding to a sidelink resource pool;
using the sidelink bandwidth part at the time domain resource location;
performing an uplink transmission in the time domain resources using the sidelink bandwidth part; and
in response to frequency resources used for the uplink transmission being not completely within a frequency domain resource range corresponding to the sidelink bandwidth part, discarding the uplink transmission.

* * * * *